United States Patent [19]

Tsuda et al.

[11] Patent Number: 4,551,722
[45] Date of Patent: Nov. 5, 1985

[54] APPARATUS AND METHOD FOR DETECTING OBSTACLES IN THE PATH OF A MOVING VEHICLE

[75] Inventors: Tadashi Tsuda, Nagoya; Seiichiro Hiramatsu, Oobu; Mitsugi Ohtsuka; Tsuyoshi Maeno, both of Chiryu, all of Japan

[73] Assignee: Nippondenso Co., Ltd., Kariya, Japan

[21] Appl. No.: 475,626

[22] Filed: Mar. 15, 1983

[30] Foreign Application Priority Data

Mar. 16, 1982 [JP] Japan ................................. 57-41917

[51] Int. Cl.⁴ .......................... G08G 1/00; G01S 13/00; G01S 15/93
[52] U.S. Cl. .................................... 340/904; 340/901; 343/7 VM; 367/909; 367/112
[58] Field of Search ................. 340/901, 904, 903, 53; 180/169; 343/7 VM; 367/112, 909, 126

[56] References Cited

U.S. PATENT DOCUMENTS 3,778,823 12/1973 Sato ....................................... 367/909
3,860,923 1/1975 Yamanaka ....................... 343/7 VM
4,240,152 12/1980 Duncan .
4,500,977 2/1985 Gelhard .............................. 367/909

FOREIGN PATENT DOCUMENTS 2047405 11/1980 United Kingdom .

Primary Examiner—James J. Groody
Attorney, Agent, or Firm—Cushman, Darby & Cushman

[57] ABSTRACT

Obstacles in the path of a vehicle are detected by an ultrasonic radar system which measures the time between the instance of transmission of an ultrasonic wave pulse and another instance of reception of an echo signal. The transmitting period is controlled to be retarded from a reference or standard transmitting period by a time length including the measured time at every other transmitting period. The measured time is compared with a reference time to check whether a detected obstacle is within a dangerous range. This comparison is effected at every other transmitting period so that a false detection signal caused from a far obstacles is prevented from being produced. As a result of the comparison an alarming device is energized to alert the vehicle driver when necessary.

10 Claims, 9 Drawing Figures

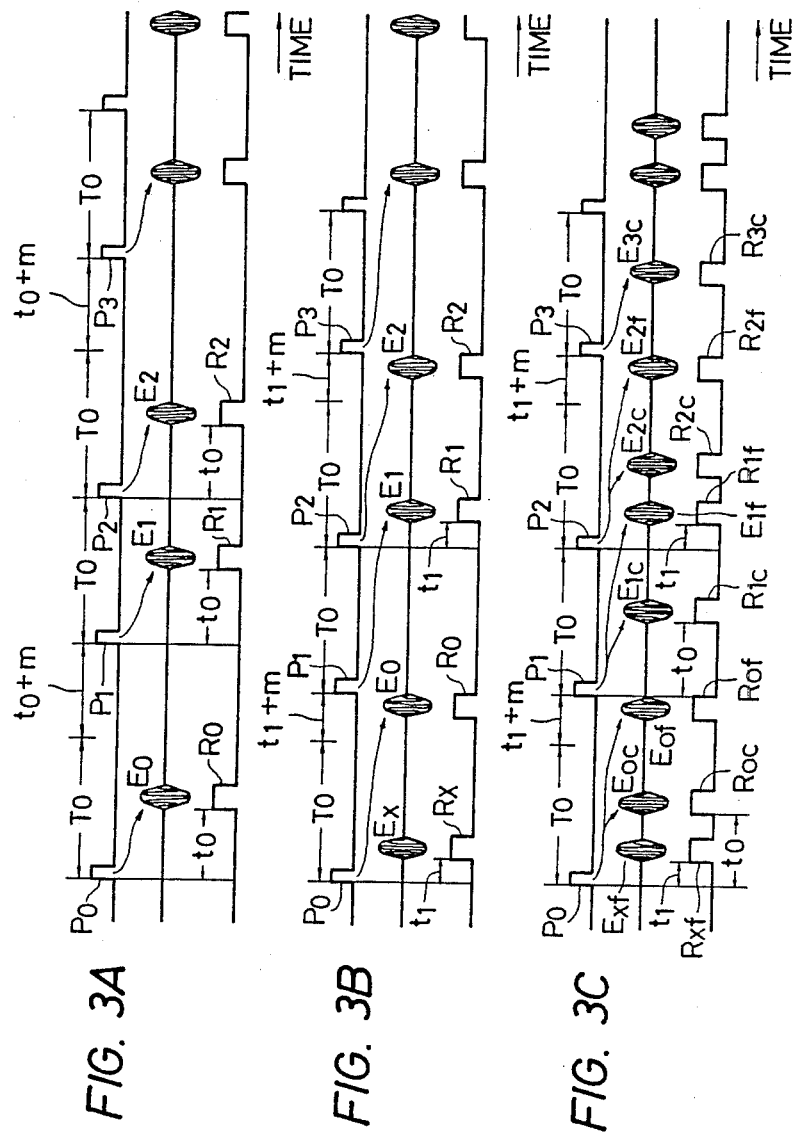

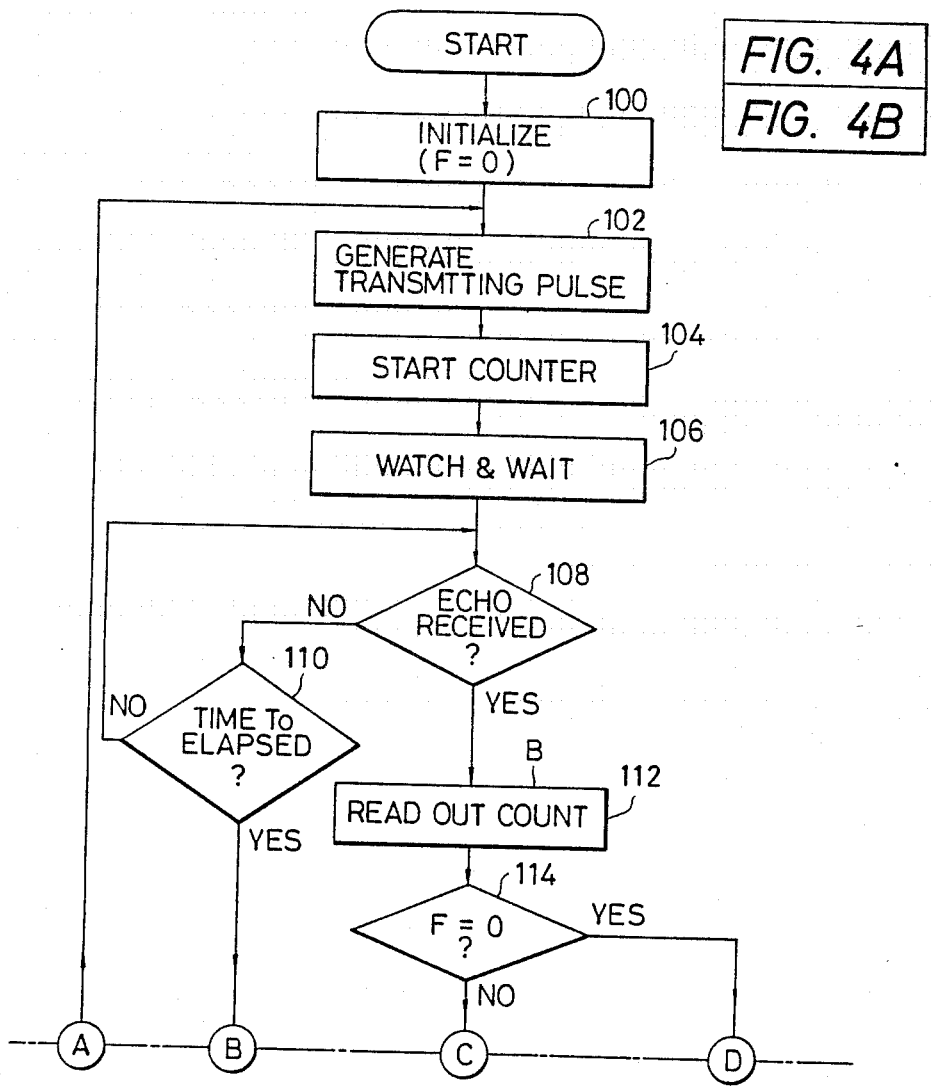

APPARATUS AND METHOD FOR DETECTING OBSTACLES IN THE PATH OF A MOVING VEHICLE

BACKGROUND OF THE INVENTION

This application is related to co-pending application Ser. No. 321,224 filed on Nov. 13, 1981.

This invention relates generally to radar systems for vehicles, and more particularly, the present invention relates to apparatus and method for detecting obstacles in the path of a moving vehicle, for example, behind a backing automobile by using an ultrasonic detector.

Various systems for detecting the presence of obstacles behind a backing vehicle are known. Conventional alarming devices for such use employs an ultrasonic radar system. Namely, ultrasonic wave pulses are transmitted backward when a motor vehicle is backing so that waves or echos reflected at obstacles are received. The received echo signal is processed to detect the presence of obstacles or to detect the distance between the motor vehicle and the obstacle. When an obstacle is detected to be close to the motor, an alarm is given to the vehile driver so that he or she can stop the backing vehicle to prevent undesirable collision. However, in such conventional detecting and alarming systems, the detecting circuit therein is apt to malfunction due to echos reflected at obstacles which are located far from the vehicle. For instance, if there is a wall, fence or the like at a distance relatively far from a backing vehicle, a false detection signal is apt to be produced, which undesirably alerts the vehicle driver. The production of such a false detection signal is caused by repetitive transmission of ultrasonic wave pulses which is necessary to continuously detect obstacles during the backward movement of the vehicle. Namely, an echo signal caused by ultrasonic wave pulse transmitted in a former cycle is apt to be received in a subsequent cycle when the obstacle is located far behind the vehicle. Since such an echo signal is processed as an echo signal corresponding to the ultrasonic wave pulse transmitted in the present cycle, it has been inevitable to distinguish an echo signal from a far obstacle from another echo signal from a close obstacle.

SUMMARY OF THE INVENTION

The present invention has been developed in order to remove the above-described drawbacks inherent to the conventional ultrasonic radar systems.

It is, therefore, an object of the present invention to provide a new and useful ultrasonic detecting apparatus and method for accurately checking the presence of obstacles in the path of a moving vehicle, for example, behind a backing vehicle and the distance between the obstacle(s) and the vehicle for generating an alarm signal.

According to a feature of the present invention ultrasonic wave pulses are intermittently transmitted, and the transmitting period thereof is changed such that it becomes longer and shorter at every other interval. Ultrasonic wave pulses reflected at an obstacle behind a vehicle is received and processed to measure its travelling time to detect the distance between the detected obstacle and the vehicle. A distance-indicating time data obtained in this way will be compared to a predetermined time to check whether the obstacle is within a dangerous range or not. This comparison, however, is effected at every other transmitting period so that a false detection signal is prevented from being produced.

BRIEF DESCRIPTION OF THE DRAWINGS

The object and features of the present invention will become more readily apparent from the following detailed description of the preferred embodiments taken in conjunction with the accompanying drawings in which:

FIGS. 3A, 3B and 3C are timing charts useful for understanding the operation of the embodiment of FIG. 1.

The same or corresponding elements and parts are designated at like reference numerals throughout the drawings.

DETAILED DESCRIPTION OF THE INVENTION

Figure 1:
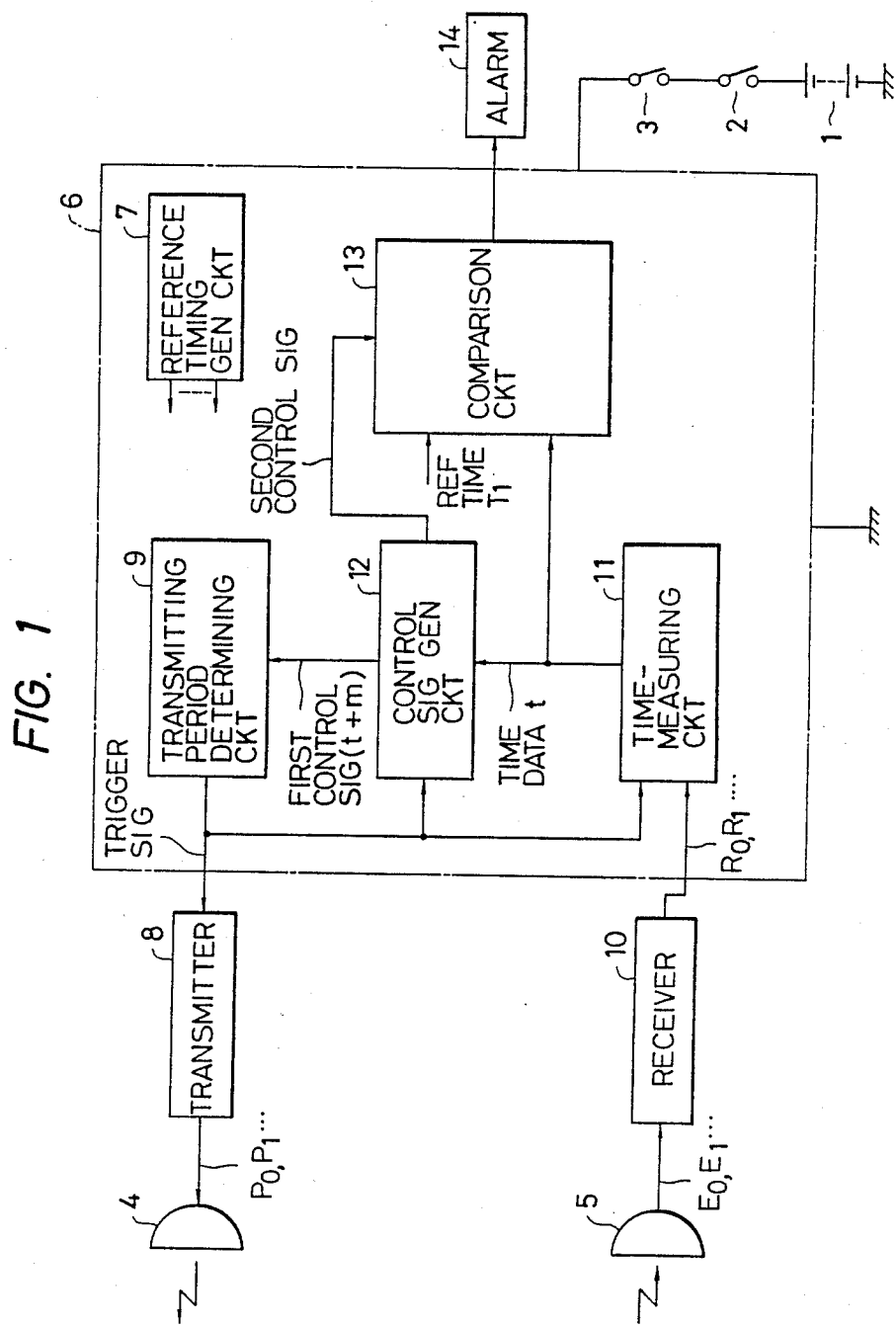
FIG. 1 is a schematic block diagram showing an embodiment of the apparatus according to the present invention, which apparatus is made of discrete circuits.

Referring now to FIG. 1 of the drawings, a schematic diagram of an embodiment of the apparatus according to the present invention is shown. As will be described later, a driving-detecting circuitry used in the apparatus as its main part may be actualized by a microcomputer. However, in order to make clear the general structure and operation of the apparatus, the apparatus will be described with reference to a block diagram of FIG. 1 first.

The apparatus for detecting obstacles behind a backing vehicle is designed to be used in an automobile, and is powered by a battery 1 mounted on the vehicle. Electrical power is arranged to be supplied to the apparatus via an ignition key switch 2 and a backing switch 3 which closes when the vehicle tranmission is in reverse-gear position. Therefore, the apparatus operates only when these two switches 2 and 3 are closed. The apparatus comprises an ultrasonic transmitting transducer 4 and an ultrasonic receiving transducer 5 which are mounted at the rear of the vehicle so that ultrasonic waves are directed backward and reflected echo signals are received. The transmitting transducer 4 receives a transmitting signal produced in a transmitter 8, and the receiving transducer 5 sends a received echo signal to a receiver 10 which produces a pulse signal in response to the received echo signal. The transducers 4 and 5 as well as the transmitter 8 and the receiver 10, which constitute a part of an ultrasonic radar system, are well known in the art, and therefore further description thereof is omitted.

The apparatus also comprises an alarming device 14, such as a buzzer, lamp or the like. The alarming device 14 is arranged to be energized when one or more obstacles are detected to be located close to the rear of the vehicle. The apparatus further comprises the above-mentioned driving-detecting circuit 6. The driving-detecting circuit 6 is used to drive the transmitter 8 so that ultrasonic wave pulses are transmitted at desired timings, and to detect the presence of obstacles from received echo signals. The driving-detecting circuit 6, comprises a reference timing generating circuit 7, a transmitting period determining circuit 9, a time-measuring circuit 11, a control signal generating circuit 12, and a comparison circuit 13.

The reference timing generating circuit 7 comprises clock generators for producing clock pulses which are used by various circuits as will be described later.

The transmitting period determining circuit 9 produces a pulse train signal which is used as a trigger signal for the transmitter 8. Namely, the transmitter 8 is controlled so that ultrasonic wave pulses are periodically transmitted from the transmitting transducer 4 at an interval. The interval or period between two consecutive trigger pulses is referred to as a transmitting period hereafter. Although the transmitting period is fixed to a predetermined value, which is referred to as a reference transmitting period $T_0$, at the beginning of operation, it is variable as will be described later.

The time-measuring circuit 11 is responsive to both the output pulse signals from the transmitting period determining circuit 9 and the receiver 10 so as to produce an output signal indicative of an interval between the instant of ultrasonic wave transmission and a subsequent instance of ultrasonic wave pulse reception. This time-measuring circuit 11 may be actualized by a counter arranged to start counting the number of clock pulses in response to the trigger signal from the transmitting period determining circuit 9, and to stop counting in response to the output signal from the receiver 10. Since this output signal represents the distance between the vehicle and the detected obstacle, it is referred to as distance-indicating time.

Figure 2:
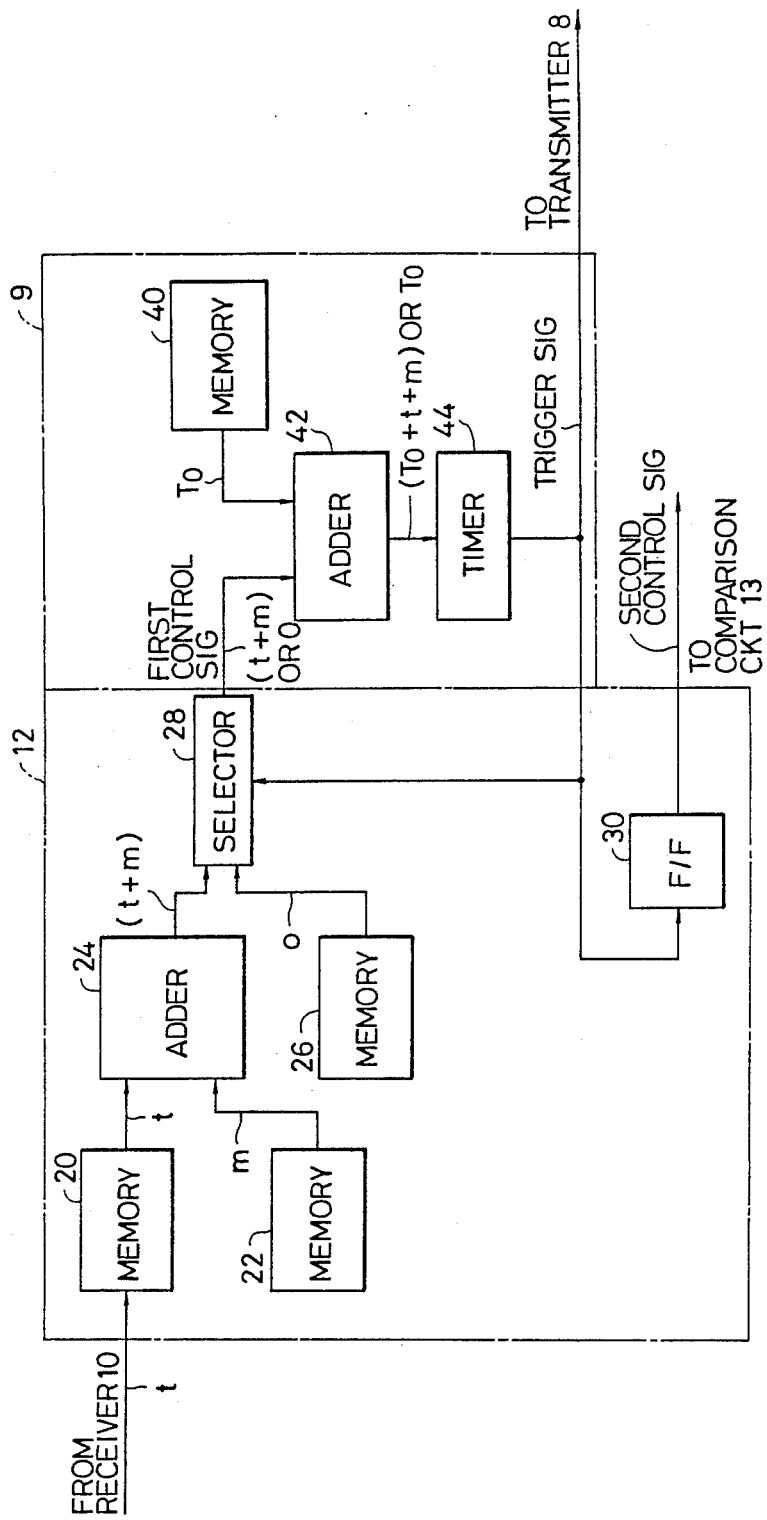
FIG. 2 is a block diagram showing a detailed structure of the transmitting period determining circuit and the control signal generating circuit both included in the block diagrm of FIG. 1.

The control signal generating circuit 12 comprises, as shown in FIG. 2, memories 20, 22 and 26, an adder 24, a selector 28, and a flip-flop 30 so that first and second control signals are produced which are respectively applied to the transmtting period determining circuit 9 and to the comparison circuit 13. The memories 20 and 22 are arranged to store two data, one being the distance-indicating time from the time-measuring circuit 11 and the other being a masking time corresponding to the width of a pulse of transmitted ultrasonic waves. The distance-indicating time indicative of the distance between the vehicle and the detected obstacle is expressed in terms of t, and the masking time is expressed in terms of m. The adder 24 is responsive to output data from the memories 20 and 22 to deliver an output signal indicative of the sum of the distance-indicating time t and the masking time m. The selector 28 functions as a switch for selecting and transmitting one of its two inputs periodically in response to the trigger signal from the transmitting period determining circuit 9. As one of the two inputs of the selector 28 is applied the output signal from the adder 28, and as the other input is applied an output signal from the memory 26. The memory 26 prestores data indicative of zero time, and therefore, the selector 28 outputs data indicative of t+m or 0.

The output signal from the selector 28 is used as the above-mentioned first control signal, and is fed to the transmitting period determining circuit 9 having a memory 40, an adder 42, and a timer 44. The memory 40 prestores data indicative of the reference transmitting period $T_0$, and the data from the selector 28 is added to the reference transmitting period $T_0$ in the adder 42 responsive to the output signal from the memory 40 and to the output signal from the selector 28. As a result, the adder 42 produces an output singal indicative of $T_0$ or $T_0+t+m$. This signal is fed to the timer 44 so that it produces the above-mentioned trigger signal when the time $T_0$ or $T_0+t+m$ has elasped.

On the other hand, the tigger signal is applied to the flip-flop 30 so as to periodically set and reset the same. Accordingly, the flip-flop 30 produces periodically logic "1" and logic "0" signals at every other transmitting period. This logic "1" or "0" signal is used as the above mentioned second control signal which will be fed to the comparison circuit 13 in turn.

The comparison circuit 13 is controlled by the second control signal fed from the control signal generating circuit 12 for comparing the distance-indicating time t with a reference time $T_1$ indicative of a predetermined distance. Namely, the distance between the vehicle and the detected obstacle is compared with the predetermined distance to detect whether the obstacle is within a dangerous range only when the second control signal assumes logic "1". In other words, when the second control signal is of logic "0", the comparison circuit 13 is disabled. Therefore, the comparison circuit 13 performs comparison at every other transmitting period. During comparison when the distance-indicating time t is equal to or smaller than the reference time $T_1$, the comparison circuit 13 produces a given output signal with which the alarming device 14 is energized to alert the driver because it is detected that the obstacle is within a dangerous range.

The operation of the apparatus of FIG. 1 will be further described in detail taking a typical case as an example. When the vehicle transmission is put in reverse position during engine operation, both the ignition switch 2 and the backing switch 3 are in closed state. Thus, the apparatus of FIG. 1 is powered by the vehicle battery 1 to start detecting any obstacles which may exist or appear behind the backing vehicle.

The transmitting period determining circuit 9 triggers the transmitter 8 to cause the ultrasonic wave transmitting transducer 4 to emit an ultrasonic wave pulse backward. Namely, the pulse width of the ultrasonic waves is determined by the width of the triggering pulse from the transmitting period determining circuit 9. Such a trigger pulse is repeatedly fed to the transmitter 8 so that a train of ultrasonic wave pulses is emitted.

Let us assume that no obstacles are detected when the vehicle starts backing, and therefore, the vehicle driver drives the motor vehicle to further move backward. As the vehicle moves backward, the vehicle approaches one or more obstacles so that the emitted ultrasonic waves are reflected thereat, and the reflected echo signals are received by the receiving transducer 5. Therefore, the receiver 10 produces an output pulse signal which is fed to the time-measuring circuit 11. The time-measuring circuit 11 calculates the difference between the instance of transmission of the ultrasonic wave pulse and the subsequent instance of reception of the reflected echo signal for producing the above-mentioned distance-indicating time t. Such calculation is effected repeatedly at every transmitting period which is set to the above-mentioned reference transmitting period $T_0$ at this time. If no reflected echo signal is detected within the transmitting period $T_0$, the transmitting period $T_0$ is outputted as the distance-indicating time. Since the reference transmitting period $T_0$ is set to a value so that a distance corresponding thereto is much greater than a possible distance between the vehicle and an obstacle detectable by way of ultrasonic waves.

The distance-indicating time t is stored in the control signal generating circuit 12 in which the aforementioned masking time m is prestored. The control signal generating circuit 12 then outputs a sum time data (t+m) indicative of the sum of the distance-indicating time t and the masking time m. This sum time data (t+m) is fed to the transmitting period determining circuit 9 to cause the same to retard the timing of subsequent trigger pulse by the sum (t+m). As a result, the transmitting period determining circuit 9, which has been producing the trigger pulses at the reference transmitting period $T_0$, now produces and sends a subsequent trigger pulse after an interval corresponding to the total sum of the reference transmitting period $T_0$ and the sum (t+m). Namely, the transmitting period is changed from T 0 to $T_0+t+m$.

When the transmitter 8 is driven or triggered at a transmitting period corresponding to the total sum ($T_0+t+m$), the comparison circuit 13 is disabled by the second control signal, and therefore no comparison is effected. After a time corresponding to the total sum ($T_0+t+m$) has been elapsed a subsequent transmitting pulse is generated, and simultaneously the comparison circuit 13 is enabled. Thus the comparison circuit 13 compares the distance-indicating time t with the reference time $T_1$ to check whether a detected obstacle is within a dangerous range or not as described before. When one or more obstacles are detected to be within the dangerous range, the alarming device 14 is actuated. In a preferred embodiment, the alarming device comprises a sound synthesizing circuit, an amplifier and a speaker so that a message such as "Obstacles are detected." is announced. However, this alarming device may be replaced with a buzzer, a lamp or the like which alerts the vehicle driver.

When the reference transmitting time $T_0$ has elapsed after the former trigger pulse was fed to the transmitter 8 at a timing delayed by the sum time (t+m), the transmitting period determining circuit 9 sends a subsequent trigger pulse so that a subsequent ultrasonic wave pulse is emitted from the transmitting transducer 4. After that, similar operations are repeated to detect the presence of obstacles.

The operation of the apparatus will be further described in detail with reference to timing charts of FIGS. 3A, 3B and 3C. In these diagrams, top-most waveforms show the transmitting pulses $P_0$, $P_1$, $P_2$ . . . from the transmitter 8, middle waveforms show received reflected echo signals $E_0$, $E_1$, $E_2$ . . . , and the bottom-most waveforms show the output pulses $R_0$, $R_1$, $R_2$ . . . from the receiver 10. Subscripts 0, 1, 2 . . . are used to indicate that the echo signals and receiver output pulses are caused from the transmitted pulses of the same numerals. FIG. 3A shows a case in which an obstacle is located close to the rear of the vehicle, FIG. 3B shows another case in which an obstacle is located far from the rear of the vehicle, and FIG. 3C shows a further case in which obstacles are located close to and far from the rear of the vehicle. It is assumed that no other obstacles exist.

In the case of FIG. 3A in which only a close obstacle exists, when time $t_0$ has elapsed after the transmission of a transmitting pulse $P_0$, a reflected echo signal $E_0$ is received. In receipt of such a reflected echo signal $E_0$ the receiver 10 produces an output pulse $R_0$. The time $t_0$ between the instance of transmission and reception of the ultrasonic wave pulse is measured or calculated by the time-measuring circuit 11, and then the control signal generating circuit 12 produces the second control signal indicative of a sum time ($t_0+m$), and this sum time is fed to the transmitting period determining circuit 9 so that a subsequent transmitting pulse $P_1$ is retarded by the sum time $t_0+m$. In other words, the subsequent transmitting pulse $P_1$ is not transmitted when $T_0$ has passed from the instance of the transmission of the former transmitting pulse $P_0$. The distance-indicating time $t_0$ is not compared with the reference time $T_1$ at this time because the comparison circuit 13 is disabled by the second control signal from control signal generating circuit 12 as described in the above.

The subsequent transmitting pulse $P_1$ is then reflected at the close obstacle so that a subsequent reflected echo signal $E_1$ is received to cause the receiver 10 to produce a pulse $R_1$. Since the transmitting period equals $T_0+t_0+m$, the comparison circuit 13 is not disabled any more to compare the distance-indicating time $t_0$ with the reference time $T_1$. If the time $t_0$ is equal to or smaller than $T_1$, the alarming device 14 is energized to alert the vehicle driver.

In the case of FIG. 3B in which only a far obstacle exists, although an echo signal $E_x$, which is resulted from a former transmitting pulse $P_x$ (not shown), is received after the transmission of a trasmitting pulse $P_0$, the comparison circuit 13 is disabled because the transmitting period has already been changed to $T_0+t_1+m$. Therefore, comparison of the distance-indicating time $t_1$ is not effected until a subsequent transmitting pulse $P_1$ is emitted. An echo signal $E_0$ resulted from the transmitting pulse $P_0$ is received before the emission of the subsequent transmitting pulse $P_1$. However, a pulse $R_0$ corresponding to the echo signal $E_0$ does not cause the comparison circuit 13 to produce an output signal because the comparison circuit 13 is still disabled. After the emission of the transmitting pulse $P_1$, the comparison circuit 13 is enabled. However, an echo signal caused from the transmitting pulse $P_1$ is received after a subsequent transmitting pulse $P_2$ is emitted. Namely, no echo signal is received when the comparison circuit 13 is being functioning. When no pulse is applied from the receiver 10 to the time-measuring circuit 11, the time-measuring circuit 11 produces an output signal indicative of the reference transmitting period $T_0$ as described in the above. Therefore, the reference transmitting period $T_0$ is compared with the reference time $T_1$. Since the reference transmitting period $T_0$ is set to be equal to or greater than the reference time $T_1$, the comparison circuit 13 does not produce an output signal which causes the alarming device 14 to produce an alarm signal.

In the case of FIG. 3C in which both a close obstacle and a far obstacle are located behind the backing vehicle, echo signals from both the close and far obstacles are received. Subscripts "c" and "f" of $E_{0c}$, $E_{0f}$, $P_{0c}$, $P_{0f}$ . . . indicate respectively that the echo signals and the receiver output pulses correspond to the close obstacle and the far obstacle. The operation shown in FIG. 3C will be readily understood by combining the operations in the cases of FIGS. 3A and 3B. Namely, the comparison circuit 13 is disabled during the period ($T_0+t_1+m$) so that received three echos $E_{xf}$, $E_{0c}$ and $E_{0f}$ are not used to generate an alarm signal. When a subsequent transmitting pulse $P_1$ is emitted, the comparison circuit 13 is enabled for the reference transmitting period $T_0$. As a result, only an echo signal $E_{1c}$ reflected at the close obstacle is used to cause the comparison circuit 13 to generate its output signal. In other words, all the echo signals $E_{xf}$, $E_{0f}$, $E_{1f}$, $E_{2f}$... reflected at the far obstacle are ignored in connection with the operation of the comparison circuit 13. From the above-description it will be understood that only the close obstacle is effectively detected to generate an alarm signal even if echo signals from other far obstacles are also received. Since the comparison circuit 13 is periodically disabled in the above-mentioned manner, a false detection signal, which is apt to be produced in response to an echo signal from a far obstacle in conventional apparatus, is effectively prevented from being produced.

Figure 4B:
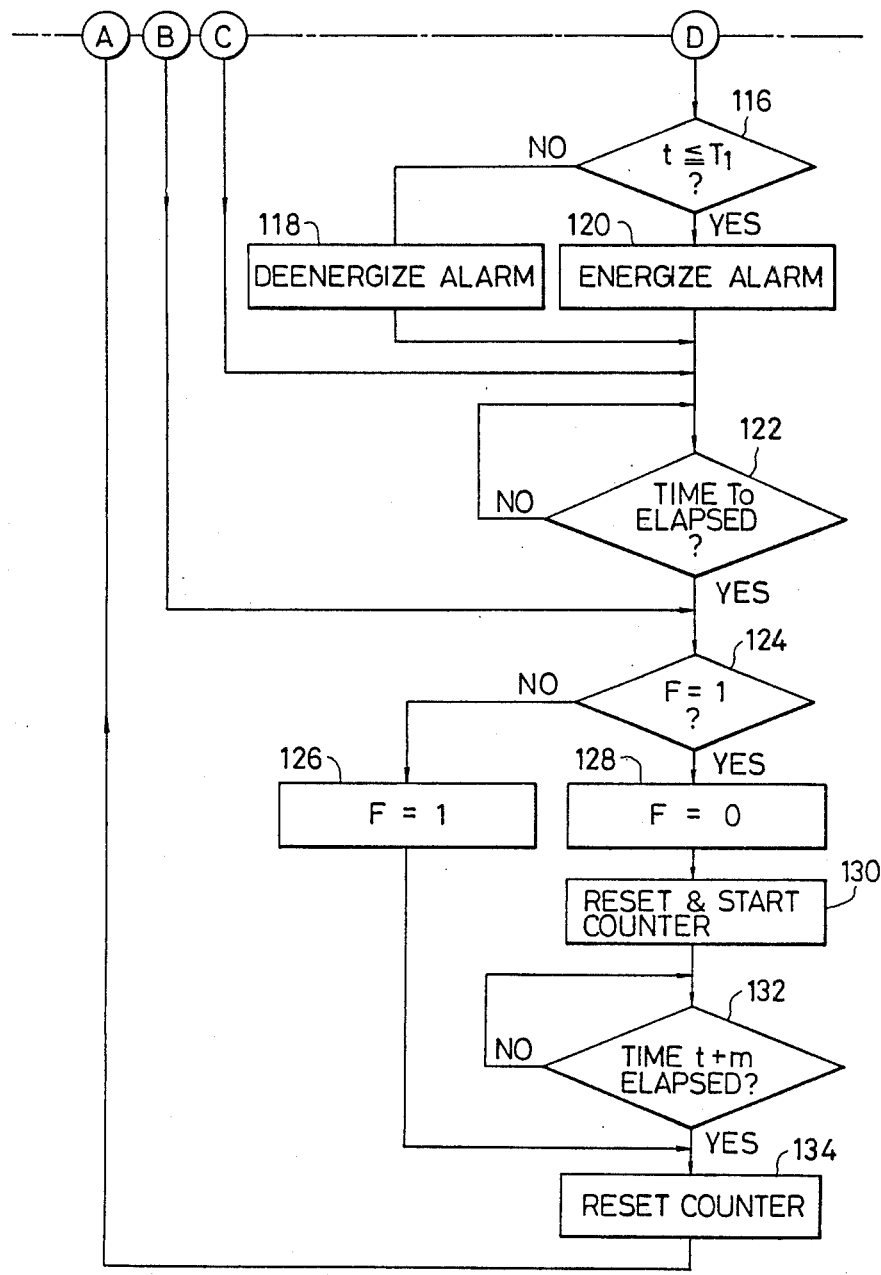
FIG. 4 composed of FIGS. 4A and 4B is a flowchart showing the operation of a microcomputer used in place of the driving-detecting circuitry of FIG. 1.

As described at the beginning of the detailed description, the driving-detecting circuitry 6 of the apparatus according to the present invention may be acualized by either discrete circuits or a microcomputer. Hence, reference is made to FIG. 4 which shows a flowchart of operational steps of a microcomputer used as the driving-detecting circuitry 6 of FIG. 1.

Figure 5:
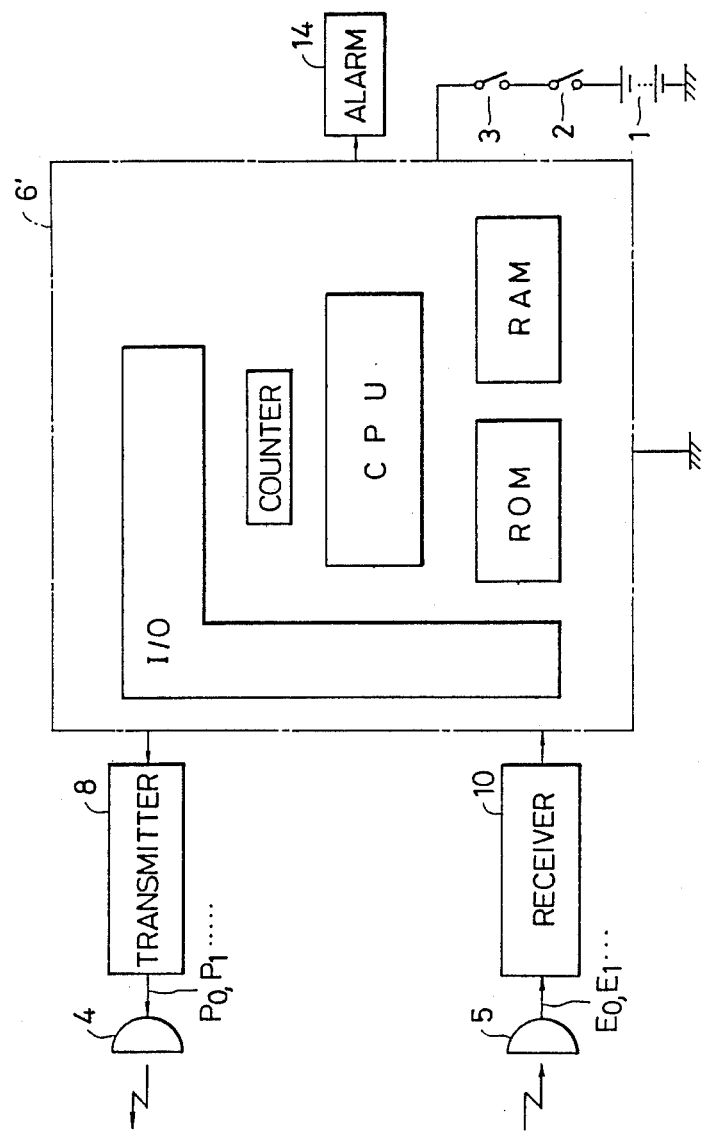
FIG. 5 is a schematic block diagram showing another embodiment of the apparatus in which a microcomputer is used.

The microcomputer per se is well known, and comprises a central processing unit (CPU), a random access memememory (RAM), a read only memory (ROM), an input/output device. A counter, which may be incorporated with the microcomputer or may be actualized by the program, is used to count the number of clock pulses from a clock generator to measure the distance-indicating time t. FIG. 5 shows a block diagram of an embodiment of the apparatus according to the present invention, which embodiment comprises the above-mentioned microcomputer. Since the microcomputer is used in place of the driving-detecting circuitry 6 of FIG. 1, it is designated at a reference 6'.

The operation of the microcomputer 6' starts when energized in response to the closure of both the ignition key switch 2 and the backing switch 3 in the same manner as in FIG. 1. As soon as the microcomputer 6' is energized, various contents prestored in the RAM are initialized in a step 100. As will be described later, a flag F is used to cause the microcomputer 6' to compare the distance-indicating time t with the reference time $T_1$ at every other transmitting period, this flag F is reset to "0" in the initializing step 100. Then a transmitting trigger pulse is generated in a following step 102, and the above-mentioned counter is started in the step 104 to count the number of clock pulses for measuring lapse of time from the instance of transmission of the ultrasonic wave pulse. A following step 106 is a watch-and-wait step for waiting for the reception of a reflected echo signal. Then in a step 108, it is checked whether an ouput pulse from the receiver 10 is detected or not. If the answer of the step 108 is NO, a step 110 takes place to check whether the reference transmitting period $T_0$ has been elapsed or not. The reference transmitting period $T_0$ is prestored in the ROM, and is read out when necessary. On the other hand, if the answer of the step 108 is YES, namely when a reflected echo signal is detected, a step 112 is executed to read out the count of the counter. Since the count is indicative of the distance-indicating time t, it will be compared with the reference time $T_1$ later.

Turning back to the step 110, if the reference transmitting period $T_0$ has not been elapsed, namely, if the answer thereof is NO, the operational flow returns to the step 108. On the other hand, if the answer is YES, the operational flow proceeds to a step 124. Following the step 112, a step 114 is executed to check whether the flag F is reset to "0" or not. This flag F is used to effect the comparison of the distance-indicating time t at every other transmitting period, and therefore, comparison is carried out only when the flag F has been set to logic "0". Namely, when the answer of the step 114 is YES, a following step 116 is executed to see whether the distance-indicating time t is equal to or smaller than the reference time $T_1$. In the case of $t \leq T_1$, a step 120 is executed to energize the alarming device 14. On the other hand in the case of $t > T_1$, a step 118 is executed to deenergize the alarming device 14.

After one of the steps 118 and 120 or in response to the NO answer of the step 114, a step 122 is executed to check whether the reference transmitting period $T_0$ has been elasped. If the answer is NO, this step 122 is repeatedly executed until $T_0$ has elapsed. When $T_0$ has been elapsed or in response to YES answer of the step 110, a step 124 is executed to check whether the flag F has been set to logic "1" or not. If the answer is YES, the flag F is reset to "0" in a step 128, and on the other hand, if the answer is NO, the flag F is set to "1" in a step 126. In the case that the step 126 is executed, the operational flow proceeds to a step 134 in which the counter is reset to zero before returning to the step 102. On the other hand, in the case that the step 128 is executed, a step 130 follows to reset the counter to zero, and start the same. Then in a step 132, it is checked whether the sum time (t+m) has been elapsed from the instance that the reference transmitting period $T_0$ has elapsed. If the answer of the step 132 is NO, the step 132 is repeatedly executed until its answer becomes YES. In response to the YES answer of the step 132 or after the execution of the step 126, the step 134 is executed to reset the counter to zero.

From the foregoing description it will be understood that the present invention provides new and useful apparatus and method for detecting obstacles behind a backing vehicle. Especially, according to the present invention since comparison of the distance-indicating time t with the reference time $T_1$ is carried out at every other transmitting period, a false detection signal, which is apt to be produced by an echo signal reflected at a far obstacle, is prevented from being produced, and therefore, the apparatus is capable of accurately detecting only dangerous obstacles.

The above-described embodiments are just examples of the present invention, and therefore, it will be apparent for those skilled in the art that many modifications and variations may be made without departing from the spirit of the present invention.

What is claimed is:
1. Apparatus for detecting obstacles in the path of a vehicle, comprising:
 (a) an ultrasonic radar system for periodically transmitting ultrasonic wave pulses and receiving echo signals reflected at obstacles;
 (b) driving-detecting means for measuring time between the instance of transmission of the ultrasonic wave pulse and the instance of reception of its echo signal for detecting the distance between said vehicle and an obstacle, and for causing said ultrasonic radar system to transmit ultrasonic wave pulses at an interval variable in accordance with the distance-indicating time, said driving-detecting means having a computing means arranged to check whether the distance-indicating time has a predetermined relationship with a reference time so as to produce an output detection signal when a detected obstacle is within a dangerous range, said computing means checking said distance-indicating time at every other transmitting period; and (c) an alarming device responsive to the result of said comparison for alerting the vehicle driver.

2. Apparatus as claimed in claim 1, wherein said computing means comprises a counter arranged to count the number of clock pulses from the instance of transmission of said ultrasonic wave pulse.

3. Apparatus as claimed in claim 1, wherein said computing means comprises a memory a portion of which is used as a flag arranged to set or reset periodically at an interval corresponding to the transmitting period, said flag being used to check said distance-indicating time at every other transmitting period.

4. Apparatus as claimed in claim 1, wherein said computing means is arranged to change the transmitting period by adding the sum of the distance-indicating time and a predetermined time to a constant reference transmitting period so that the transmitting period varies between said reference transmitting period and a sum-added transmitting period at every other transmitting period.

5. Apparatus as claimed in claim 1, wherein said apparatus is arranged to be energized when the transmission of said vehicle is set to a gear position.

6. Apparatus for detecting obstacles in the path of a vehicle, comprising:

(a) an ultrasonic radar system for periodically transmitting ultrasonic wave pulses and receiving echo signals reflected at obstacles;

(b) a transmitting period determining circuit for producing a trigger signal which causes said ultrasonic radar system to transmit ultrasonic wave pulses at a variable interval;

(c) a time-measuring circuit responsive to a received echo signal and said triggering signal for measuring the time between the instance of transmission of the ultrasonic wave pulse and reception of its echo signal for detecting the distance between said vehicle and an obstacle;

(d) a control signal generating circuit for producing first and second control signals in response to a distance-indicating time data from said time-measuring circuit, said first control signal being periodically changed between zero time and the sum of said distance-indicating time and a predetermined time in response to said trigger signal, said second control signal being changed between two states in response to said trigger signal;

(e) a comparison circuit arranged to compare said distance-indicating time from said time-measuring circuit with a reference time only when said second control signal assumes a given state, said comparison circuit producing, as a result of comparison, an output signal when said distance-indicating time is equal to or greater than said reference time; and (f) an alarming device responsive to said output signal from said comparison circuit for alerting the vehicle driver.

7. Apparatus as claimed in claim 6, wherein said transmitting period determining circuit comprises a memory in which said reference transmitting period is prestored, an adder for adding said sum time to said reference transmitting period from said memory, and a timer for producing said trigger signal when the time represented by the output signal of said adder has been elapsed.

8. Apparatus as claimed in claim 6, wherein said control signal generating circuit comprises:

(a) first, second and third memories for respectively storing said distance-indicating time, said predetermined time and data corresponding to zero time;

(b) an adder resonsive to output signals from said first and second memories for adding said predetermined time to said distance-indicating time;

(c) a selector controlled by said trigger signal for periodically transmitting the output signal from said adder and the output data from said third memory; and (d) flip-flop responsive to said trigger signal for periodically producing logic "1" and "0" signals.

9. Apparatus as claimed in claim 6, wherein said apparatus is arranged to be energized when the transmission of said vehicle is set to a gear position.

10. A method for detecting obstacles in the path of a vehicle, comprising the steps of:

(a) transmitting an ultrasonic wave pulse at a variable transmitting period;

(b) receiving an echo signal reflected at an obstacle;

(c) measuring the time between the instance of transmission of said ultrasonic wave pulse and the instance of reception of said echo signal for producing a distance-indicating time;

(d) retarding the transmitting period by a time including said distance-indicating time so that a subsequent ultrasonic wave pulse is transmitted at a retarded timing, the step of retarding being carried out at every other transmitting period;

(e) comparing said distance-indicating time with a reference time at every other transmitting period; and (f) producing an output signal when said distance-indicating time has a given relationship with said reference time for alerting the vehicle driver.

* * * * *